US012163643B1

(12) United States Patent
Dahlen et al.

(10) Patent No.: US 12,163,643 B1
(45) Date of Patent: Dec. 10, 2024

(54) LIGHT FIXTURE WITH REMOVABLY ATTACHED DOOR AND LIGHTING ASSEMBLIES

(71) Applicant: KENALL MANUFACTURING COMPANY, Kenosha, WI (US)

(72) Inventors: Kevin Dahlen, Lindenhurst, IL (US); Joseph Kempel, Des Plaines, IL (US); Brandon Stolte, Lindenhurst, IL (US)

(73) Assignee: KENALL MANUFACTURING COMPANY, Kenosha, WI (US)

( * ) Notice: Subject to any disclaimer, the term of this patent is extended or adjusted under 35 U.S.C. 154(b) by 0 days.

(21) Appl. No.: 18/508,546

(22) Filed: Nov. 14, 2023

(51) Int. Cl.
*F21V 15/01* (2006.01)
*F21V 31/00* (2006.01)
*F21Y 115/10* (2016.01)

(52) U.S. Cl.
CPC ............ *F21V 15/01* (2013.01); *F21V 31/005* (2013.01); *F21Y 2115/10* (2016.08)

(58) Field of Classification Search
CPC ..... F21V 15/01; F21V 31/005; F21Y 2115/10
See application file for complete search history.

(56) References Cited

U.S. PATENT DOCUMENTS 3,697,743 A * 10/1972 Eargle .................. F21V 17/107 362/374
2013/0027915 A1* 1/2013 Caferro .................. F21V 29/70 362/147
2014/0268692 A1* 9/2014 Edmond ................ F21S 8/026 362/225
2016/0102825 A1* 4/2016 Scribante ............. F21V 21/047 362/217.14
2020/0132264 A1* 4/2020 Scarlata .................. F21V 15/01
2023/0010234 A1* 1/2023 Ring ..................... F21V 23/002
2023/0228391 A1* 7/2023 Dixit ...................... F21S 8/022 362/365

FOREIGN PATENT DOCUMENTS

WO WO-2013151201 A1 * 10/2013 .............. A47F 11/10

OTHER PUBLICATIONS

English translation of Jang WO-2013151201-A1 (Year: 2013).*

* cited by examiner

*Primary Examiner* — Evan P Dzierzynski
(74) *Attorney, Agent, or Firm* — MARSHALL, GERSTEIN & BORUN LLP; Michael P. Furmanek

(57) ABSTRACT

A light fixture includes a housing, a door assembly, and a lighting assembly. The housing can have a top wall, sidewalls, and a bottom opening. The housing can further define a plenum chamber between the top wall, the sidewalls, and the bottom opening. The door assembly can be removably attached to the housing adjacent the bottom opening. The lighting assembly can include at least one lighting module carried by the door assembly inside of the plenum chamber such that when the door assembly is detached from the housing, the lighting assembly can be at least partially removed from the plenum chamber. The door assembly can include a door frame and an optical arrangement carried by the door frame. The optical arrangement can be configured to allow light generated by the lighting assembly to be emitted from the light fixture.

18 Claims, 4 Drawing Sheets

LIGHT FIXTURE WITH REMOVABLY ATTACHED DOOR AND LIGHTING ASSEMBLIES

FIELD OF THE DISCLOSURE

The present disclosure generally relates to light fixtures and, more particularly, to light fixtures with removable doors.

BACKGROUND

Many commercial buildings, parking structures, transportation areas, or structures (e.g., tunnels), and the like are equipped with lighting systems that include one or more luminaires or light fixtures for illuminating certain areas. Most luminaires are arranged overhead and configured to emit light in a downward direction where people, objects, vehicles, etc. are situated. In addition to such direct lighting, in certain situations it may also be preferable to emit light in an indirect direction to, for example, illuminate a ceiling or other overhead structure. To provide such indirect lighting, it may be necessary to provide additional light sources, separate from the downwardly emitting light sources, aimed in a transverse direction. However, the time and costs associated with installing and operating such additional light fixtures oftentimes makes such a configuration unfeasible.

The present disclosure sets forth light fixtures embodying advantageous alternatives to existing luminaires, and that may address one or more of the challenges or needs mentioned herein, as well as provide other benefits and advantages.

SUMMARY

A first aspect of the present disclosure includes a light fixture including a housing, a door assembly, and a lighting assembly. The housing can have a top wall, sidewalls, and a bottom opening. The housing can further define a plenum chamber between the top wall, the sidewalls, and the bottom opening. The door assembly can be removably attached to the housing adjacent the bottom opening. The lighting assembly can include at least one lighting module carried by the door assembly inside of the plenum chamber such that when the door assembly is detached from the housing, the lighting assembly can be at least partially removed from the plenum chamber. The door assembly can include a door frame and an optical arrangement carried by the door frame. The optical arrangement can be configured to allow light generated by the lighting assembly to be emitted from the light fixture.

In some aspects, the door frame can include a support member disposed in the plenum chamber and a flange member disposed outside of the plenum chamber.

In some aspects, the support member can be transverse to the flange member.

In some aspects, the at least one lighting module of the lighting assembly can include at least one light emitting diode (LED) module mounted directly to the door frame.

In some aspects, the at least one LED module can include a printed circuit board (PCB) and a plurality of light emitting diodes (LEDs).

In some aspects, the lighting assembly can further include an LED driver.

In some aspects, a plurality of fasteners can be removably securing the door frame to the housing.

In some aspects, the door frame can be constructed of a heat conductive material.

In some aspects, a gasket can be extending adjacent to a perimeter of the bottom opening of the housing, the gasket disposed between and in contact with the door frame and the housing to provide a seal for the plenum chamber.

In some aspects, the door frame can define a channel receiving the gasket.

In some aspects, a lanyard having a first end can be connected to the door frame, the lanyard configured to limit separation of the door assembly from the housing when the door assembly is detached from the housing.

In some aspects, the optical arrangement can include (a) a diffuser, (b) a light guide, and/or (c) a reflector.

Another aspect of the present disclosure provides a light fixture having a housing, a door assembly, and a lighting assembly. The door assembly can be removably attached to the housing. The lighting assembly can include at least one lighting module carried by the door assembly and disposed at least partially in the housing such that when the door assembly is detached from the housing, the lighting assembly is at least partially removed from the housing. The door assembly can include a door frame and an optical arrangement carried by the door frame. The optical arrangement can be configured to allow light generated by the lighting assembly to be emitted from the light fixture.

In some aspects, the door frame can include a support member disposed in the housing and a flange member in contact with the housing.

In some aspects, the support member can be transverse to the flange member.

In some aspects, the at least one lighting module of the lighting assembly can include at least one light emitting diode (LED) module mounted directly to the door frame.

In some aspects, the at least one LED module can include a printed circuit board (PCB) and a plurality of light emitting diodes (LEDs).

In some aspects, the lighting assembly further can include an LED driver.

In some aspects, a plurality of fasteners can be removably securing the door frame to the housing.

In some aspects, the door frame can be constructed of a heat conductive material.

In some aspects, a gasket can be disposed adjacent to a perimeter of the bottom opening of the housing, the gasket disposed between and in contact with the door frame and the housing to provide a seal for the plenum chamber.

In some aspects, the door frame can define a channel receiving the gasket.

In some aspects, a lanyard having a first end can be connected to the door frame, the lanyard configured to limit separation of the door assembly from the housing when the door assembly is detached from the housing.

In some aspects, the optical arrangement can include (a) a diffuser, (b) a light guide, and/or (c) a reflector.

DETAILED DESCRIPTION

Figure 1:
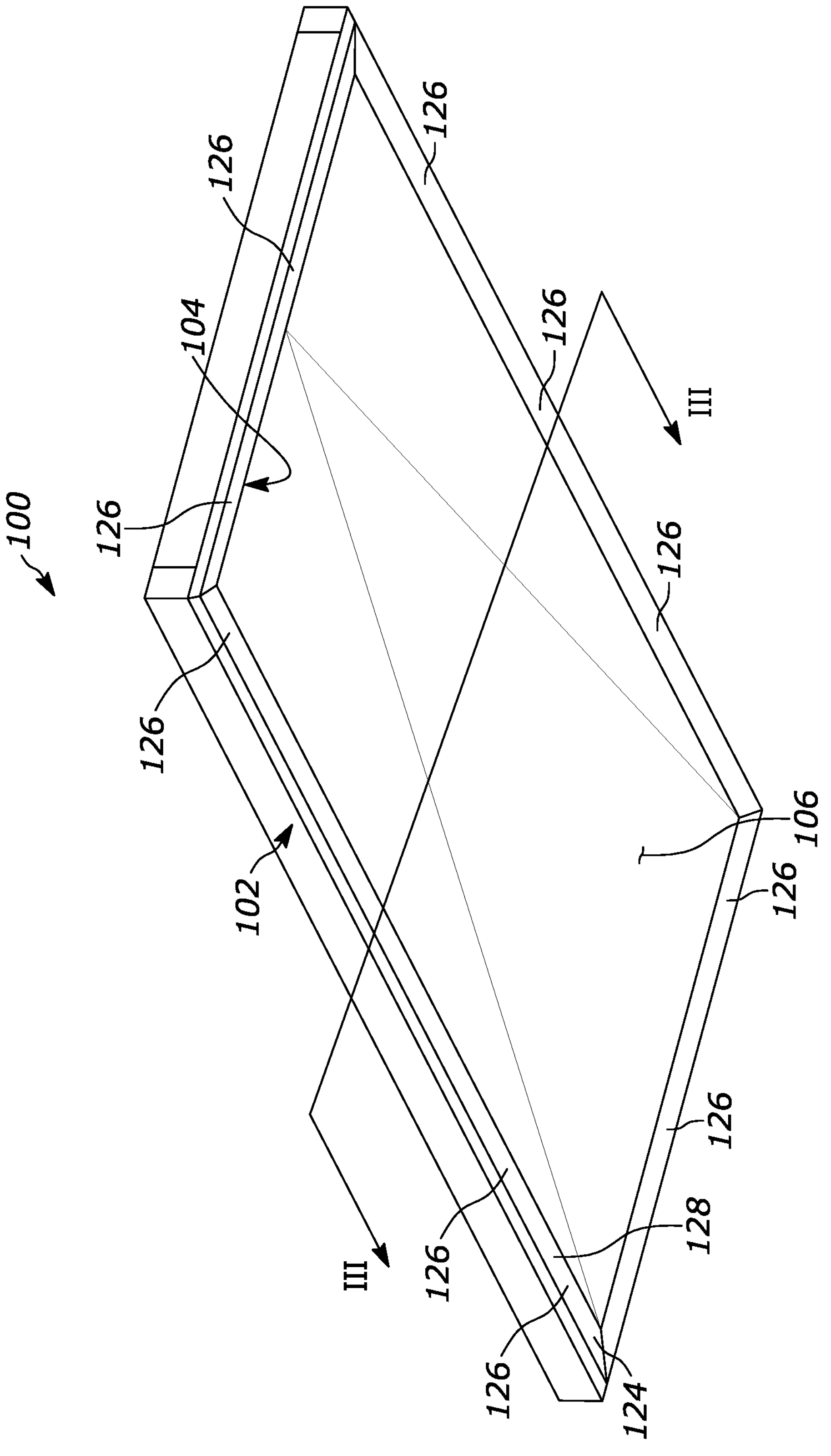
FIG. 1 is a perspective view of one example of a light fixture in accordance with the principles of the present disclosure including a housing and removably attached door and lighting assemblies.

FIG. 1 is a perspective view of a light fixture 100 constructed accordance with the principles of the present disclosure. The light fixture 100 is configured for mounting to a ceiling of a facility including, for example, a medical office, a surgical room, a clean room, or other workspace. In some configurations, the light fixture 100 can be designed to be hung from ceiling tile grids and/or recessed into traditional drywall ceilings, as is generally known. As such, the light fixture 100 can be of generally any size suitable for the intended objective such as two feet wide by four feet long (2'×4'), two feet wide by two feet long (2'×2'), or any other size. The light fixture 100 can be characterized as having a shallow plenum because of its small vertical height dimension. Such shallow plenum lights can be desirable in environments that lack significant clearance above the ceiling such as, for example, clean rooms and/or other healthcare and/or manufacturing facilities.

Figure 2:
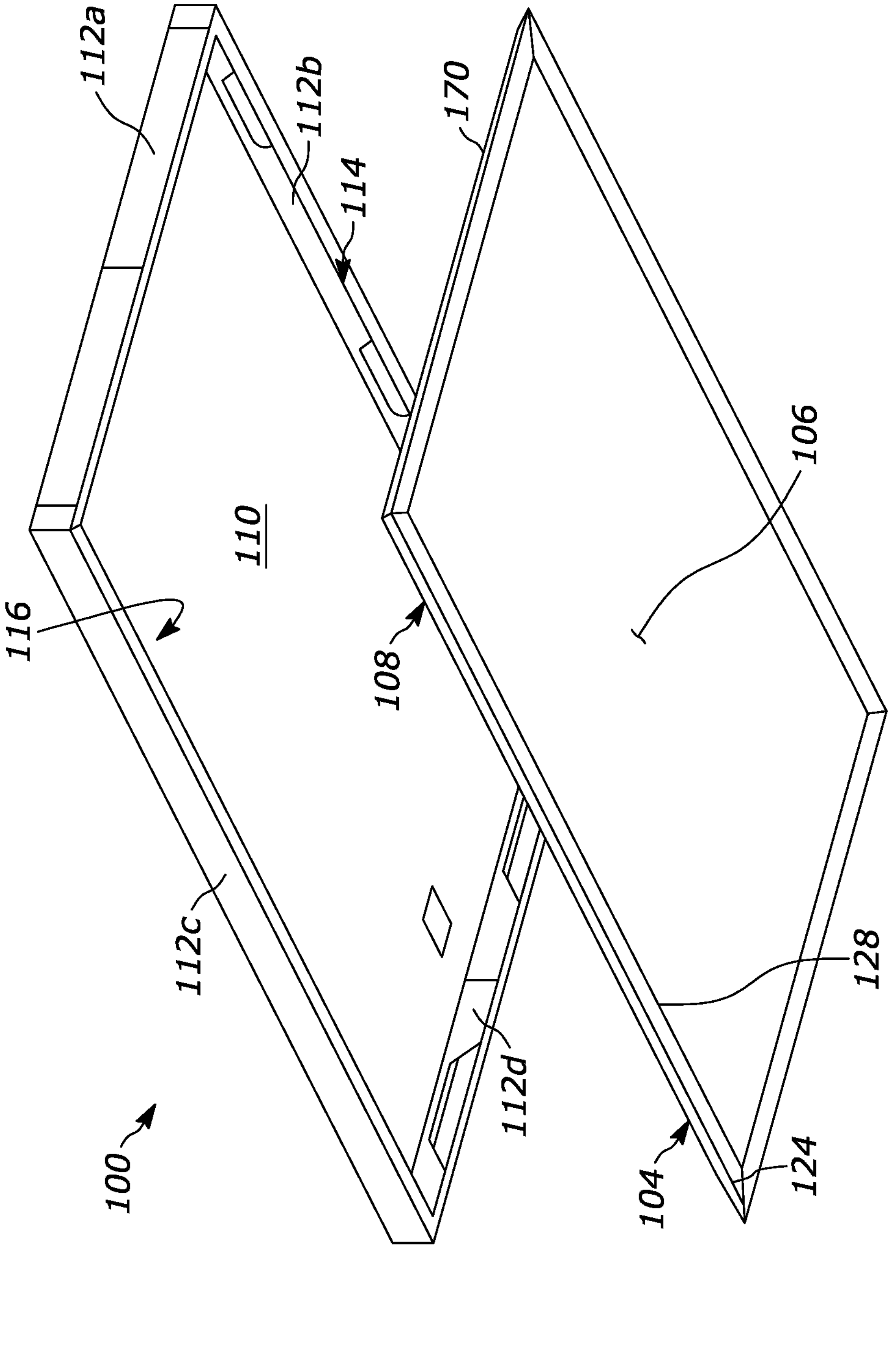
FIG. 2 is a perspective view of the light fixture of FIG. 1 showing the door and lighting assemblies detached from the housing.

As illustrated in FIGS. 1 and 2, the light fixture 100 includes a housing 102 and a door assembly 104 that is removably attached to the housing 102. The door assembly 104 includes an optical arrangement 106 and carries a lighting assembly 108 (seen in FIGS. 2-4) that is disposed in the housing 102 when the door assembly 104 is attached to the housing 102. Thus, when operational, the lighting assembly 108 emits light through the optical arrangement 106 to illuminate the environment below the light fixture 100. As shown in FIG. 2 and mentioned above, the door assembly 104 can be detached from the housing 102. Moreover, because the door assembly 104 carries the lighting assembly 108, the lighting assembly 108 can be at least removed from the housing 102 when the door assembly 104 is detached. This configuration advantageously facilitates maintenance operations by allowance a technician to simply remove the door assembly 104 and easily access the lighting assembly 108 to replace electrical and/or electronic components that might require replacement. In fact, this configuration easily enables the entire door assembly 104 and lighting assembly 108 to be detached from the housing 102 and swapped out for an entirely different (e.g., new or refurbished) door assembly 104 and lighting assembly 108. Thus, the disclosed configuration advantageously reduces maintenance down time and increases overall efficiency of the facility.

Referring to FIG. 2, the disclosed housing 102 is generally rectangular in shape and includes a top wall 110, sidewalls 112*a*, 112*b*, 112*c*, 112*d*, and a bottom opening 114. The top wall 110, sidewalls 112*a*, 112*b*, 112*c*, 112*d*, and bottom opening 114 define a plenum chamber 116 inside of the housing 102. The housing 102 can be constructed of sheet metal or another desired material that is stamped or cut and shaped into the desired configuration. The door assembly 104 is generally the same shape as the housing 102 and is sized and shaped to occupy the bottom opening 114 and close the plenum chamber 116 when attached to the housing 102. In some configurations, the door assembly 104 can seal against the housing 102 around the perimeter of the bottom opening 114, thereby sealing off the plenum chamber 116. In some versions, the plenum chamber 116 can be sealed against intrusion by air and/or water.

Figure 3:
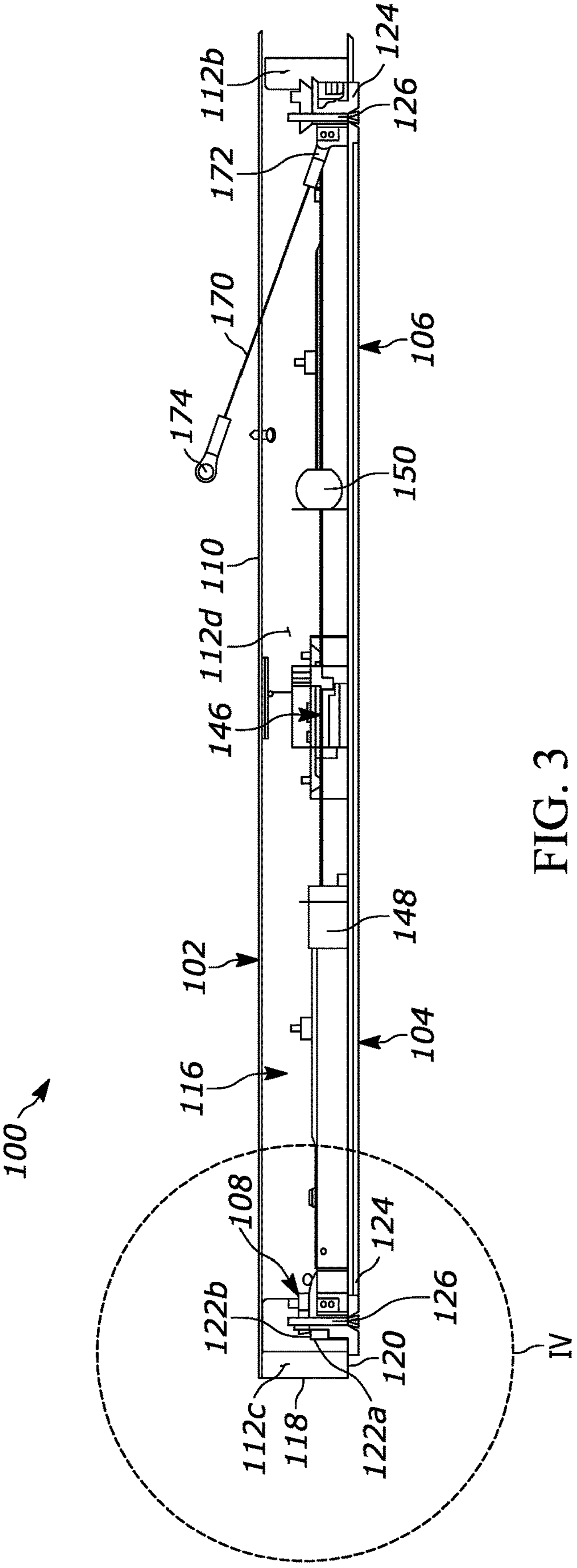
FIG. 3 is a cross-section of the light fixture of FIGS. 1 and 2 taken through line III-III of FIG. 1.
Figure 4:
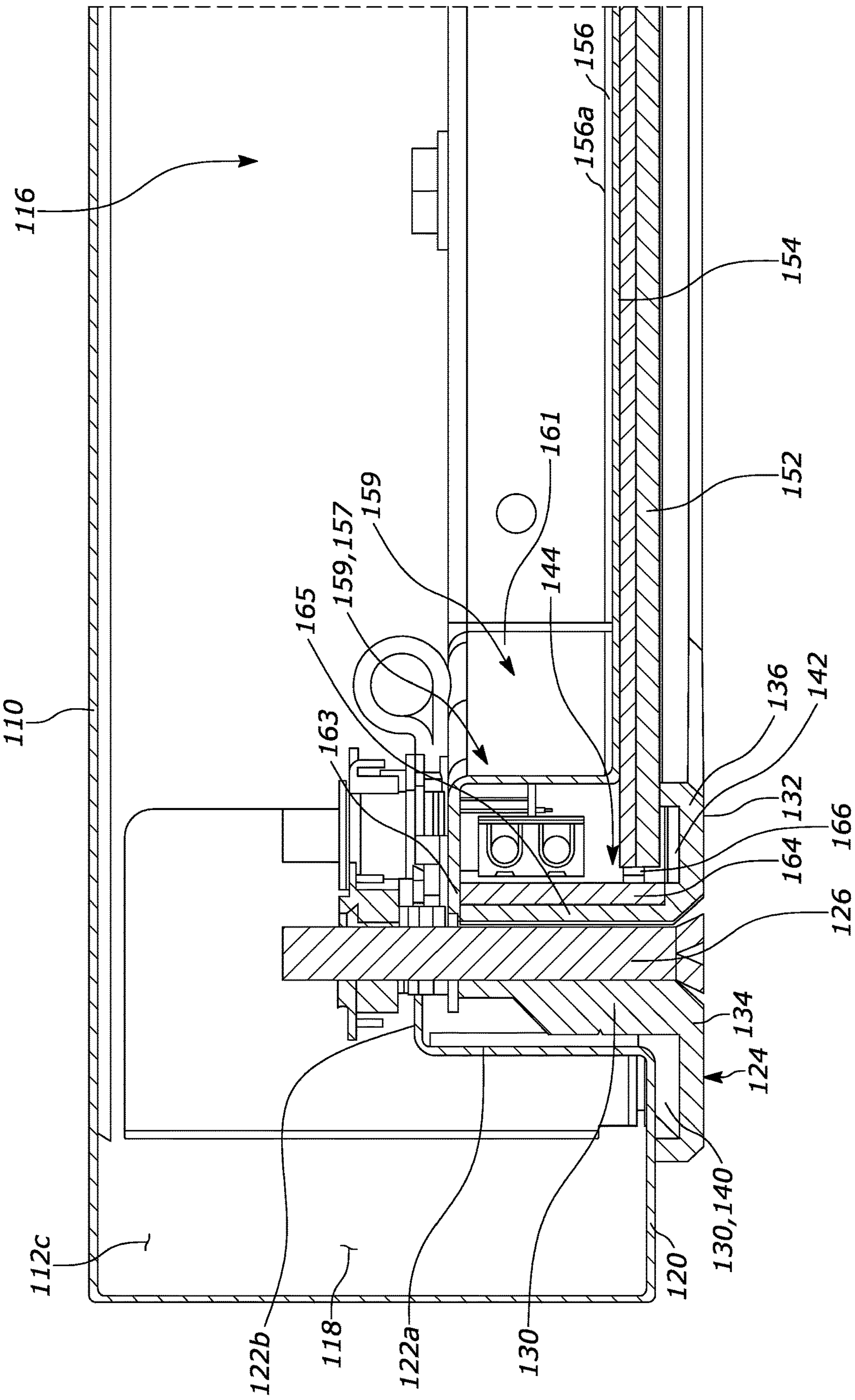
FIG. 4 is a detail view of the light fixture of FIGS. 1-3 taken from circle IV of FIG. 3.

FIG. 3 illustrates a cross-section of the light fixture 100 of the present disclosure taken through line III-III of FIG. 1. FIG. 4 illustrates a detail view of the cross-section of the light fixture 100 taken from circle IV of FIG. 3. As shown, the sidewalls 112*a*, 112*b*, 112*c*, 112*d* of the housing 102 are contoured to facilitate removable attachment of the door assembly 104 and lighting assembly 108. In particular, in the disclosed configuration, each side wall 112*a*, 112*b*, 112*c*, 112*d* includes an external side panel 118, a bottom panel 120, and a stepped mounting flange 122. Each external side panel 118 extends down from a corresponding perimeter edge of the top wall 110 of the housing 102. Each bottom panel 120 extends inward toward the bottom opening 114 of the housing 102 from a bottom edge of the corresponding external side panel 118. And each mounting flange 122 includes a vertical leg 122*a* extending up from an internal edge of the corresponding bottom panel 118, and a horizontal leg 122*b* extending inward from an upper edge of the corresponding vertical leg 122*a*. As such, each mounting flange 122 is generally L-shaped in cross-section, as best shown in FIG. 4. This configuration of the sidewalls 112*a*, 112*b*, 112*c*, 112*d* helps facilitate removable attachment of the door assembly 104 and lighting assembly 108 to the housing 102, as will be described below.

With continued reference to FIG. 3, the door assembly 104 includes a door frame 124 and the optical arrangement 106. The door frame 124, as best seen in FIGS. 1 and 2, extends entirely around the bottom opening 114 of the housing 102 and defines a central opening 128 in which the optical arrangement 106 is mounted. In some versions, the door frame 124 includes four separate pieces, each extending along the length of a respective one of the four sides of the bottom opening 114 of the housing 102. The four separate pieces of the door frame could have mitered corners connected together by snap fit, adhesive, welding, or some other means.

With reference to FIG. 4, the door frame 124 of the disclosed configuration includes a support member 130 and a flange member 132. When the door assembly 104 is mounted to the housing 102, the support member 130 is disposed in the plenum chamber 116 and the flange member 132 is disposed outside of the plenum chamber 116. In the disclosed configuration, the support member 130 is disposed transverse to the flange member 132 and can include, for example, a T-shaped cross-section. In the perspective illustrated in FIGS. 3 and 4, the T-shaped cross-section is upside down. The support member 130 of the door frame 104 includes a generally flat elongated upright member such as a web of material extending the length of the door frame 104 around the bottom opening 114 of the housing 102. The flange member 132 includes a generally flat elongated horizontal member such as a web of material extending the length of the door frame 104 around the bottom opening 114 of the housing 102. In some versions, the support member 130 and flange member 132 of the door frame 124 are integrally constructed of a single extruded material. In other versions, the support member 130 and flange member 132 could be constructed separately and connected together with snap fit, adhesive, welding, or some other means. As can be seen in FIG. 4, for example, the flange member 132 can be described as including an outer flange portion 134 that resides outside of the perimeter of the bottom opening 114 of the housing 102, and an inner flange portion 136 that resides inside of the perimeter of the bottom opening 114 of the housing 102.

So configured, the inner flange portion 136 supports an outer perimeter edge of the optical arrangement 106 and the outer flange portion 134 engages the bottom panel 120 of each of the sidewalls 112*a*, 112*b*, 112*c*, 112*d*. In the configuration depicted in FIG. 4, for example, the outer flange portion 134 can be shaped to define a channel 138 facing the bottom panel 120 of the sidewalls 112*a*, 112*b*, 112*c*, 112*d*. In some versions, the channel 138 in the outer flange portion 134 can receive a gasket 140. As such, the gasket 140 can be disposed between and in contact with the door frame 124 and the housing 102 to provide a seal for the plenum chamber 116, thereby making the plenum chamber 116 airtight and/or water tight. The gasket 140 may include a rubber gasket, a silicone gasket, a felt gasket, or any other type of gasket or other material capable of serving the intended objective. In some configurations, the inner flange portion 136 can define a similar channel 142 to accommodate a similar gasket disposed between and in contact with the door frame 124 and the optical arrangement 106 to provide an additional seal, if desired.

The optical arrangement 106, as depicted in FIG. 4, for example, is suited for facilitating a side lighting arrangement and can include a diffuser 152, a light guide 154, and a reflector 156. The diffuser 152 and light guide 154 include conventional flat optical components. In the depicted version, the light guide 154 is disposed (e.g., stacked) on top of the diffuser 152. The reflector 156 can also include a generally conventional component disposed (e.g., stacked) on top of the light guide 154. The reflector 156 includes a generally flat central portion 156*a* disposed on the light guide 154 and a perimeter portion 157 (seen in FIG. 4) that includes stepped portion 159 having an vertical wall 161 and a horizontal wall 163. The horizontal wall 163 can extend outward from the vertical wall 161 and can be connected to the support member 130 of the door frame 124 with a fastener, adhesive, weld, or any other means. So configured, the reflector 156 secures the light guide 154 and diffuser 152 in position on top of the inner flange portion 136 of the flange member 132 of the door frame 124. With the optical arrangement 106 so positioned, the lighting assembly 108 can emit light toward the side edges of the light guide 154, and the light guide 154 allows the light to travel out of the bottom through the diffuser 152. The reflector 156 can be constructed of a metallic or plastic material coated in a highly reflective white coating or paint, for example, such that any light travelling upward through the light guide 154 reflects back down through the diffuser 152.

The light fixture 100 can include a plurality of fasteners 126 extending through the door frame 124 and connecting to the sidewalls 112*a*, 112*b*, 112*c*, 112*d* of the housing 102 such as, for example, the horizontal legs 122*b* of the mounting flanges 122 of the sidewalls 112*a*, 112*b*, 112*c*, 112*d*. In some versions, the fasteners 126 can include threaded fasteners such as screws for easy removal and installation of the door assembly 104 and lighting assembly 108. To this end, the light fixture may further include a lanyard 170 (seen in FIG. 3) for preventing the door assembly 104 and lighting assembly 108 from falling to the ground when the fasteners 126 are removed. The lanyard 170, for example, can include a first end 172 fixed to the door assembly 104 and a second end 174 adapted to be fixed to a ceiling of the facility. Said another way, the lanyard 170 is configured to limit separation of the door assembly 104 from the housing 102 when the door assembly 104 is detached from the housing 102.

Referring back to FIG. 3, the lighting assembly 108 includes at least one lighting module 144, a driver 146, an optional surge protector 148, and an optional fuse 150. The lighting module 144, the driver 146, the optional surge protector 148, and the optional fuse 150 are all electrically coupled together and physically connected to and carried by the door assembly 104. Moreover, although not depicted, the lighting assembly 108 can include a quick connect coupling electrically connected to the other lighting assembly components and for connecting the light fixture to hardwired electrical power in the facility in which the light fixture 100 is installed.

In FIG. 4, the lighting module 144 can be coupled directly or indirectly to the door frame 124. The driver 146, optional surge protector 148, and optional fuse 150 can be indirectly coupled to the door frame 124 by being connected to the reflector 156 of the optical arrangement 106, which is in turn connected to the door fame 124. Thus, when the door assembly 104 is detached from the housing 102, the lighting assembly 108 is removed from the housing 102 and in particular at least partially removed from the plenum chamber 116 of the housing 102 to allow a technician to gain access to these components for maintenance, for example. Moreover, to replace the door assembly 104 and lighting assembly 108 with different door assembly 104 and lighting assembly 108, a technician can easily disconnect the electrical quick connect coupling as well as the lanyard 170.

As mentioned above, the optical arrangement 106 and the lighting assembly 108 of the presently disclosed light fixture 100 are configured for side lighting. As shown in FIG. 4, this is realized by positioning the at least one lighting module 144 at the side edge of the optical arrangement 106. That is, the at least one lighting module 144 can include a light emitting diode (LED) module 162 including a printed circuit board (PCB) 164 and a plurality of light emitting diodes (LEDs) 166 mounted to the PCB 164. In some versions, the PCB 164 and LEDs 166 can extend completely around the edge of the optical arrangement 106. In other variations, the PCB 164 and LEDs 166 can extend around only one or more side edges of the optical arrangement 106. For example, in one variation, the PCB 164 and LEDs 166 can be positioned only on opposite left-side and right-side edges of the optical arrangement 106 or opposite front and rear side edges of the optical arrangement 106.

The PCB 164 in the disclosed version is mounted directly onto an inner facing surface 165 of the support member 130 of the door frame 124 and the plurality of LEDs 166 are mounted to the PCB 164 in a linear array such that light emitted from the LEDs 166 shines directly into the side edge of the light guide 154. The PCB 164 may be directly mounted to the support member 130 of the frame member 124 with an adhesive or some other means through which heat can be conducted. In this configuration, the door frame 124 can be constructed also of a heat conducting material such as a metallic material (e.g., aluminum, steel, etc.) such that heat generated by the LEDs 166 and PCB 164 conducts to the door frame 124 and the door frame 124 can serve as a heat sink. Specifically, heat absorbed from the LEDs 166 and PCB 164 by the support member 130 of the door frame 124 can be conducted out of the plenum chamber 116 by the flange member 132 of the door frame 124 which resides outside of the housing 102 in the surrounding ambient environment. This advantageously allows the door frame 124 to release heat from the lighting assembly 108 out of the housing 102 without requiring additional heat sinks and/or exhaust fans, for example.

While the foregoing disclosure has described a light fixture 100 with a lighting assembly 108 and optical arrangement 106 for side lighting, alternative variations can be arranged differently. For example, any configuration of lighting assembly 108 and optical arrangement 106 could be included. The lighting assembly 108 could include, for example, a two-dimensional array of LEDs arranged directly above an optical arrangement for projecting light directly down out of the optical arrangement. In such a configuration, the optical arrangement 106 may not require a reflector or a light guide, or the reflector may be positioned above the two-dimensional array of LEDs.

Moreover, while the disclosure has focused on LEDs as the light source for the lighting assembly 108, other sources of light could also be implemented within the spirit and scope of the present disclosure.

As such, it should be appreciated that the present disclosure provides only an example configuration of the presently disclosed invention, which is defined only by the claims.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A light fixture comprising:

a housing having a top wall, sidewalls, and a bottom opening, the housing defining a plenum chamber between the top wall, the sidewalls, and the bottom opening; and a door assembly removably attached to the housing adjacent the bottom opening; and a lighting assembly comprising at least one lighting module carried by the door assembly inside of the plenum chamber such that when the door assembly is detached from the housing, the lighting assembly is at least partially removed from the plenum chamber, the door assembly comprising a door frame and an optical arrangement carried by the door frame, the optical arrangement configured to allow light generated by the lighting assembly to be emitted from the light fixture, the at least one lighting module comprising a printed circuit board (PCB) mounted directly to an inner facing surface of the door frame and a plurality of light emitting diodes (LEDs) mounted to the PCB such that light emitted by the plurality of LEDs shines directly into side edges of the optical arrangement.

2. The light fixture of claim 1, wherein the door frame comprises a support member disposed in the plenum chamber and a flange member disposed outside of the plenum chamber.

3. The light fixture of claim 2, wherein the support member is transverse to the flange member.

4. The light fixture of claim 1, wherein the lighting assembly further comprises an LED driver.

5. The light fixture of claim 1, wherein the door frame is constructed of a heat conductive material.

6. The light fixture of claim 1, further comprising a gasket extending adjacent to a perimeter of the bottom opening of the housing, the gasket disposed between and in contact with the door frame and the housing to provide a seal for the plenum chamber.

7. The light fixture of claim 6, wherein the door frame defines a channel receiving the gasket.

8. The light fixture of claim 1, further comprising a lanyard having a first end connected to the door frame, the lanyard configured to limit separation of the door assembly from the housing when the door assembly is detached from the housing.

9. The light fixture of claim 1, wherein the optical arrangement comprises (a) a diffuser, (b) a light guide, and/or (c) a reflector.

10. The light fixture of claim 1, wherein the door frame comprises an upright support member and a horizontal flange member disposed transverse to the support member, and the support member defines the inner facing surface of the door frame.

11. A light fixture comprising:

a housing;

a door assembly removably attached to the housing; and a lighting assembly comprising at least one lighting module carried by the door assembly and disposed at least partially in the housing such that when the door assembly is detached from the housing, the lighting assembly is at least partially removed from the housing, the door assembly comprising a door frame and an optical arrangement carried by the door frame, the optical arrangement configured to allow light generated by the lighting assembly to be emitted from the light fixture, the at least one lighting module comprising a printed circuit board (PCB) mounted directly to an inner facing surface of the door frame and a plurality of light emitting diodes (LEDs) mounted to the PCB such that light emitted by the plurality of LEDs shines directly into side edges of the optical arrangement.

12. The light fixture of claim 11, wherein the door frame comprises a support member disposed in the housing and a flange member in contact with the housing.

13. The light fixture of claim 12, wherein the support member is transverse to the flange member.

14. The light fixture of claim 11, wherein the lighting assembly further comprises an LED driver.

15. The light fixture of claim 11, wherein the door frame is constructed of a heat conductive material.

16. The light fixture of claim 11, further comprising a gasket disposed between and in contact with the door frame and the housing.

17. The light fixture of claim 11, wherein the optical arrangement comprises (a) a diffuser, (b) a light guide, and/or (c) a reflector.

18. The light fixture of claim 11, wherein the door frame comprises an upright support member and a horizontal flange member disposed transverse to the support member, and the support member defines the inner facing surface of the door frame.

* * * * *